Patented May 23, 1933

1,910,478

UNITED STATES PATENT OFFICE

KARL SCHMIDT, OF LEVERKUSEN-ON-THE-RHINE, GERMANY, ASSIGNOR TO GENERAL ANILINE WORKS, INC., OF NEW YORK, N. Y., A CORPORATION OF DELAWARE

POLYMETHINE DYESTUFF

No Drawing. Application filed December 20, 1929, Serial No. 415,616, and in Germany December 24, 1928.

The present invention relates to new polymethine dyestuffs of the probable general formula:

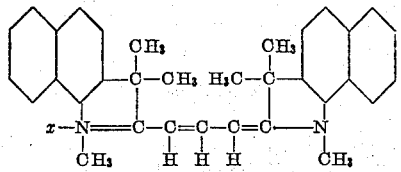

wherein $x$ stands for the residue of an acid and wherein the naphthalene nuclei may be substituted by monovalent substituents, such as halogen atoms, the acetylamino group or the like.

My new dyestuffs may be prepared as follows: By reducing a diazotized alpha-naphthylamine, causing the resulting hydrazine derivative to interact with acetone and then performing ring formation by means of concentrated sulfuric acid, an alpha-methyl-1-naphthindole is formed having the probable formula

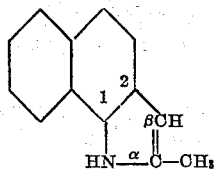

wherein the naphthalene nucleus may be substituted, which is subsequently converted into the alpha-beta-beta-trimethyl iodo-, bromo, or chloro-methylate by means of the corresponding methyl-halide. The resulting products probably correspond to the general formula

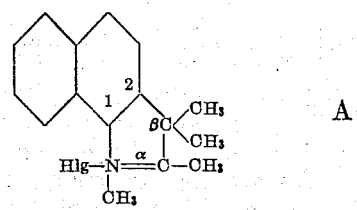   A wherein the naphthalene nucleus may be substituted. The compounds, thus obtained, are treated with an ortho-formic acid ester or an alkali metal formate in acetic anhydride solution at about 120–135° C., whereby formation of my new dyestuffs corresponding to the first mentioned general formula is effected, in which formula $x$ stands for the residue of hydrochloric-, hydrobromic- or hydroiodic acid. Similar dyestuffs of the same general formula, in which $x$ stands for another acid residue, may be prepared, for example, by dissolving the former dyestuffs in water, adding caustic soda lye until the free base has formed and causing salt formation again by the addition of an acid other than a hydrohalic acid, such as sulfuric acid, formic acid, oxalic acid, benzoic acid or the like. It will also be possible to prepare such dyestuffs by treating a compound of the formula marked A with caustic soda lye, whereby the corresponding methylene base is formed having the formula

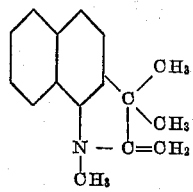

wherein the naphthalene nucleus may be substituted. Subsequently this base is caused to act upon an alkali metal formate or an ortho-formic acid ester in acetic anhydride solution at about 30–40° C., whereby the formate of a dyestuff of the first mentioned general formula is obtained. This dyestuff may be converted into other quarternary salts either by double decomposition, for example, with sodium chloride in aqueous solution or by adding caustic soda lye to the formate, whereby the dyestuff base is freed and can be converted into other salts by the addition of any other acid.

The dyestuffs thus obtainable form yellowish to greenish glittering dark crystals which are soluble in alcohol with blue coloration and in concentrated sulfuric acid with a brown coloration, dyeing tanned cotton reddish-blue to greenish-blue shades of good fastness properties.

The following examples illustrate my invention without limiting it thereto, the parts being by weight.

Example 1

10 parts of the bromo methylate of alpha-beta-beta-trimethyl-1-naphthindolenine (obtainable by the action of methylbromide on alpha-methyl-1-naphthindol) are dissolved in 100 parts of acetic anhydride. After the addition of 5 parts of ortho-formic acid ethyl ester the reaction mixture is heated to boiling under a reflux until the formation of the dyestuff is completed. The separation of the dyestuff formed is carried out either by distilling off part of the acetic anhydride and causing the dyestuff to crystallize or by dissolving the distillation residue in hot water and allowing crystallization to proceed thereafter. The dyestuff, thus obtained, dyes mordant cotton or other textiles, such as wood and the like, clear reddish-blue shades of good fastness properties. It probably corresponds to the formula:

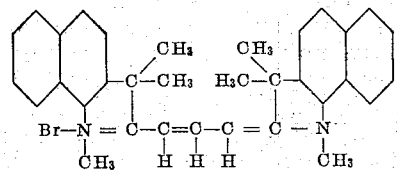

Other salts of the dyestuff base, for example, such as are formed with hydrochloric acid or an organic acid, which salts are particularly desirable for textile printing, can be obtained, for example by dissolving the iodide in water, adding caustic soda lye until the free base has formed, by separating the free dyestuff base from the bromide and then treating the latter with the corresponding acid, or by using for the condensation the base obtainable from the bromo methylate of alpha-beta-beta-trimethyl-1-naphthindolenine by splitting off hydrogen bromide by means of caustic soda lye and converting the resulting dyestuff base into the desired salts by the addition of the corresponding acid.

Example 2

10 parts of the iodo methylate of alpha-beta-beta-trimethyl-8-chloro-1-naphthindolenine are dissolved in 100 parts of acetic anhydride and 3 parts of sodium formate are added, thereupon the reaction mixture is heated at about 130–135° C. for about 1–2 hours. Thereafter the mixture is poured into hot water, whereby a solution is formed from which the dyestuff separates in the form of yellowish to greenish glittering crystals which are soluble in concentrated sulfuric acid with a brown coloration, dyeing tanned cotton or cellulose acetate silk reddish-blue shades of good fastness properties. It probably corresponds to the formula:

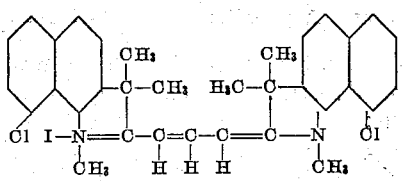

Example 3

15 parts of amido-methylene-trimethyl-1-naphthindoline (obtainable by nitrating and reducing alpha-methylene-trimethyl-1-naphthindoline, are heated with 50 parts of acetic anhydride and 5 parts of sodium formate at about 30–40° C. until the formation of the dyestuff is completed. The reaction product is worked up as described in Example 2. The dyestuff, thus obtained, which corresponds to the probable formula:

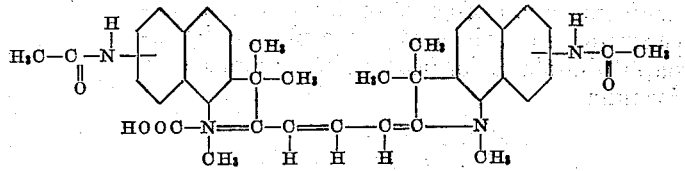

dyes tanned cotton a clear greenish-blue of good fastness properties.

I claim:—

1. The products of the probable general formula:

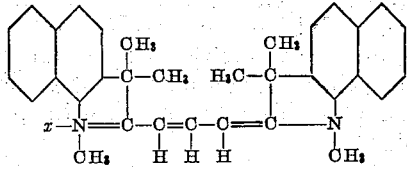

wherein $x$ stands for an acid residue and wherein the naphthalene nuclei may be substituted by monovalent substituents selected from the group consisting of halogen and the acylamino group, said products forming yellowish to greenish glittering dark crystals which are soluble in concentrated sulfuric acid with a brown coloration, dyeing tanned cotton reddish-blue to greenish-blue shades of good fastness properties.

2. The product of the probable formula:

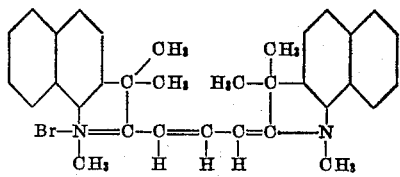

said product dyeing mordant cotton clear reddish-blue shades of good fastness properties.

3. The product of the probable formula:

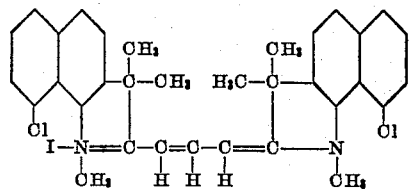

said product dyeing tanned cotton or cellulose acetate silk reddish-blue shades of good fastness properties.

4. The product of the probable formula:

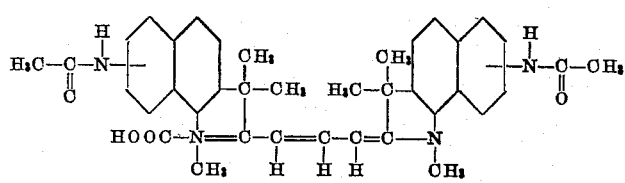

said product dyeing tanned cotton a clear greenish-blue of good fastness properties.

In testimony whereof, I affix my signature.

KARL SCHMIDT.